United States Patent
Dodworth

(10) Patent No.: US 10,399,307 B2
(45) Date of Patent: Sep. 3, 2019

(54) REINFORCED COMPOSITE STRUCTURE

(71) Applicant: BRIGHT LITE STRUCTURES LLC, San Francisco, CA (US)

(72) Inventor: Antony Dodworth, Stamford Lincolnshire (GB)

(73) Assignee: BRIGHT LITE STRUCTURES LLC, San Francisco, CA (US)

( * ) Notice: Subject to any disclaimer, the term of this patent is extended or adjusted under 35 U.S.C. 154(b) by 0 days.

(21) Appl. No.: 15/311,344

(22) PCT Filed: Jun. 3, 2015

(86) PCT No.: PCT/US2015/034061
§ 371 (c)(1),
(2) Date: Nov. 15, 2016

(87) PCT Pub. No.: WO2015/187873
PCT Pub. Date: Dec. 10, 2015

(65) Prior Publication Data
US 2017/0072656 A1 Mar. 16, 2017

Related U.S. Application Data

(60) Provisional application No. 62/007,614, filed on Jun. 4, 2014, provisional application No. 62/007,632, filed
(Continued)

(51) Int. Cl.
*B32B 3/12* (2006.01)
*B32B 27/12* (2006.01)
(Continued)

(52) U.S. Cl.
CPC ............. *B32B 27/12* (2013.01); *B29B 7/88* (2013.01); *B29B 13/02* (2013.01); *B29C 43/203* (2013.01);
(Continued)

(58) Field of Classification Search
CPC ........................................................ B32B 3/20
(Continued)

(56) References Cited

U.S. PATENT DOCUMENTS 2,882,673 A 4/1959 Heinrich
3,051,992 A 9/1962 Bradley
(Continued)

FOREIGN PATENT DOCUMENTS

CN 101946051 A 1/2011
CN 201755923 U 3/2011
(Continued)

OTHER PUBLICATIONS

International Search Report and Written Opinion from International Application No. PCT/US2015/034061 dated Aug. 19, 2015.
CompositesWorld, "High-tensile strength, high-modulus carbon fiber" Mar. 10, 2014 [online] [retrieved on Oct. 1, 2015). Retrieved from the Internet <URL: http://www.compositesworld.com/products/high-tensile-strength-high-modulus-carbon-fiber>.
(Continued)

*Primary Examiner* — Brent T O'Hern
(74) *Attorney, Agent, or Firm* — Dorsey & Whitney LLP

(57) ABSTRACT

A reinforced composite structure that includes multiple regions of different geometric configurations connected together by a transition region. The reinforced composite structure includes reinforcement fibers on at least a portion of the transition region.

20 Claims, 6 Drawing Sheets

Related U.S. Application Data on Jun. 4, 2014, provisional application No. 62/007,652, filed on Jun. 4, 2014, provisional application No. 62/007,670, filed on Jun. 4, 2014, provisional application No. 62/007,685, filed on Jun. 4, 2014, provisional application No. 62/108,837, filed on Jan. 28, 2015.

(51) Int. Cl.

| | | |
|---|---|---|
| *B32B 37/14* | (2006.01) | |
| *C08G 18/00* | (2006.01) | |
| *B29D 24/00* | (2006.01) | |
| *B29C 70/02* | (2006.01) | |
| *B29C 70/34* | (2006.01) | |
| *B32B 27/36* | (2006.01) | |
| *B29C 43/20* | (2006.01) | |
| *B29C 43/34* | (2006.01) | |
| *B29C 43/56* | (2006.01) | |
| *B32B 3/20* | (2006.01) | |
| *B32B 5/02* | (2006.01) | |
| *B32B 5/18* | (2006.01) | |
| *B29B 7/88* | (2006.01) | |
| *B29B 13/02* | (2006.01) | |
| *B29C 70/30* | (2006.01) | |
| *B32B 27/10* | (2006.01) | |
| *B32B 27/20* | (2006.01) | |
| *B32B 27/38* | (2006.01) | |
| *B32B 27/40* | (2006.01) | |
| *B32B 5/24* | (2006.01) | |
| *B32B 27/06* | (2006.01) | |
| *B29C 44/12* | (2006.01) | |
| *B32B 38/00* | (2006.01) | |
| *B29K 69/00* | (2006.01) | |
| *B29K 105/08* | (2006.01) | |
| *B29L 31/30* | (2006.01) | |
| *B29K 105/00* | (2006.01) | |
| *B29K 63/00* | (2006.01) | |
| *B29K 75/00* | (2006.01) | |
| *B29K 105/04* | (2006.01) | |
| *B29K 105/16* | (2006.01) | |
| *B29K 307/04* | (2006.01) | |
| *B29K 509/00* | (2006.01) | |
| *B29L 9/00* | (2006.01) | |
| *B29C 67/20* | (2006.01) | |

(52) U.S. Cl.
CPC .............. *B29C 43/34* (2013.01); *B29C 43/56* (2013.01); *B29C 44/1209* (2013.01); *B29C 70/02* (2013.01); *B29C 70/305* (2013.01); *B29C 70/34* (2013.01); *B29C 70/345* (2013.01); *B29D 24/005* (2013.01); *B32B 3/12* (2013.01); *B32B 3/20* (2013.01); *B32B 5/02* (2013.01); *B32B 5/024* (2013.01); *B32B 5/18* (2013.01); *B32B 5/245* (2013.01); *B32B 27/065* (2013.01); *B32B 27/10* (2013.01); *B32B 27/20* (2013.01); *B32B 27/365* (2013.01); *B32B 27/38* (2013.01); *B32B 27/40* (2013.01); *B32B 37/146* (2013.01); *C08G 18/003* (2013.01); *B29C 44/1285* (2013.01); *B29C 67/205* (2013.01); *B29C 2043/561* (2013.01); *B29C 2043/568* (2013.01); *B29K 2023/06* (2013.01); *B29K 2063/00* (2013.01); *B29K 2069/00* (2013.01); *B29K 2075/00* (2013.01); *B29K 2105/04* (2013.01); *B29K 2105/041* (2013.01); *B29K 2105/0872* (2013.01); *B29K 2105/16* (2013.01); *B29K 2105/251* (2013.01); *B29K 2307/04* (2013.01); *B29K 2509/00* (2013.01); *B29L 2009/00* (2013.01); *B29L 2031/30* (2013.01); *B32B 2038/0024* (2013.01); *B32B 2305/022* (2013.01); *B32B 2305/076* (2013.01); *B32B 2605/00* (2013.01)

(58) Field of Classification Search
USPC ........................................................ 428/114
See application file for complete search history.

(56) References Cited

U.S. PATENT DOCUMENTS

| | | |
|---|---|---|
| 3,303,733 A | 2/1967 | Sheffield et al. |
| 3,484,398 A | 12/1969 | Childs |
| 4,543,289 A | 9/1985 | Park |
| 4,687,691 A | 8/1987 | Kay et al. |
| 4,940,563 A | 7/1990 | Kromrey |
| 5,034,256 A | 7/1991 | Santiso, III et al. |
| 5,484,500 A | 1/1996 | Kaufmann et al. |
| 5,540,870 A | 7/1996 | Quigley |
| 5,683,782 A | 11/1997 | Duchene et al. |
| 5,756,182 A | 5/1998 | Landi et al. |
| 5,979,531 A | 11/1999 | Barr et al. |
| 6,038,949 A | 3/2000 | Jander |
| 6,197,146 B1 | 3/2001 | Sucic et al. |
| 8,028,736 B2 | 10/2011 | Jander |
| 8,334,055 B2 | 12/2012 | Le Gall et al. |
| 8,556,358 B2 | 10/2013 | Fitzgerald et al. |
| 8,777,136 B2 | 7/2014 | Jander |
| 2002/0010973 A1 | 1/2002 | Dumlao et al. |
| 2002/0045696 A1 | 4/2002 | Sullivan et al. |
| 2002/0106503 A1 | 8/2002 | Monk et al. |
| 2002/0176979 A1 | 11/2002 | Evans |
| 2003/0098520 A1 | 5/2003 | Cournoyer et al. |
| 2003/0130411 A1 | 7/2003 | Ishikawa et al. |
| 2003/0175455 A1 | 7/2003 | Erb et al. |
| 2004/0028877 A1 | 2/2004 | Itoh et al. |
| 2006/0048311 A1* | 3/2006 | Lee .................. E01D 19/125 14/73 |
| 2006/0065152 A1 | 3/2006 | Heitmeyer et al. |
| 2006/0251902 A1 | 11/2006 | Botrie et al. |
| 2007/0125042 A1 | 6/2007 | Hughes et al. |
| 2007/0256379 A1 | 11/2007 | Edwards |
| 2010/0255283 A1 | 10/2010 | Monk et al. |
| 2010/0261000 A1 | 10/2010 | Jones |
| 2011/0089183 A1 | 4/2011 | Gundelsheimer |
| 2011/0180959 A1 | 7/2011 | Donnelly et al. |
| 2011/0272509 A1 | 11/2011 | Jander |
| 2012/0098300 A1 | 4/2012 | Murray |
| 2012/0141765 A1 | 6/2012 | Katahira et al. |
| 2012/0177874 A1 | 7/2012 | Brandon et al. |
| 2012/0204741 A1 | 8/2012 | Bremmer et al. |
| 2013/0101822 A1 | 4/2013 | Kunal et al. |
| 2013/0171381 A1 | 7/2013 | Grove-Nielsen |
| 2013/0203878 A1 | 8/2013 | Igualada et al. |
| 2013/0224410 A1 | 8/2013 | Nozawa |
| 2013/0273308 A1 | 10/2013 | Day et al. |
| 2013/0284003 A1 | 10/2013 | Dodworth |
| 2013/0292076 A1 | 11/2013 | Raghavendran et al. |
| 2013/0323429 A1 | 12/2013 | Strobel et al. |
| 2014/0011016 A1 | 1/2014 | Vanimisetti et al. |
| 2014/0145470 A1 | 5/2014 | Preisler et al. |
| 2017/0095997 A1 | 4/2017 | Dodworth |

FOREIGN PATENT DOCUMENTS

| | | |
|---|---|---|
| CN | 102227521 A | 10/2011 |
| CN | 102548741 A | 7/2012 |
| CN | 104254439 A | 12/2014 |
| DE | 102013225730 A1 | 6/2015 |
| EP | 0352993 A1 | 1/1990 |
| EP | 0478033 A1 | 4/1992 |
| EP | 0605235 A2 | 7/1994 |
| EP | 0628406 A2 | 12/1994 |
| EP | 0794051 A1 | 9/1997 |

(56) References Cited

FOREIGN PATENT DOCUMENTS

| EP | 0798107 A2 | 10/1997 |
|---|---|---|
| FR | 2890893 A1 | 3/2007 |
| GB | 2101930 A | 1/1983 |
| GB | 2300380 A | 11/1996 |
| JP | Y1965027900 | 9/1965 |
| JP | 51041764 A | 4/1976 |
| JP | S5334866 Y2 | 8/1978 |
| JP | S57113695 U | 7/1982 |
| JP | 01320145 A | 12/1989 |
| JP | 02088227 A | 3/1990 |
| JP | H05132540 A | 5/1993 |
| JP | H06270304 A | 9/1994 |
| JP | 06344477 A | 12/1994 |
| JP | 07047626 A | 2/1995 |
| JP | H0718081 U | 3/1995 |
| JP | 07125118 A | 5/1995 |
| JP | H07180281 A | 7/1995 |
| JP | 08258189 A | 10/1996 |
| JP | 11207843 A | 8/1999 |
| JP | 11247356 A | 9/1999 |
| JP | H11254563 A | 9/1999 |
| JP | 2000043171 A | 2/2000 |
| JP | 2001031838 A | 2/2001 |
| JP | 2004017355 A | 1/2004 |
| JP | 2006188688 A | 7/2006 |
| JP | 2008230235 A | 10/2008 |
| JP | 2008238566 A | 10/2008 |
| JP | 2010149260 A | 7/2010 |
| JP | 2013001006 A | 1/2013 |
| JP | 2013032510 A | 2/2013 |
| JP | 2014533751 A | 12/2014 |
| WO | 90/00968 | 2/1990 |
| WO | 92/12855 A | 8/1992 |
| WO | 2003101719 A2 | 12/2003 |
| WO | 2009011304 A1 | 1/2009 |
| WO | 2009157295 A1 | 12/2009 |
| WO | 2013178755 A1 | 12/2013 |
| WO | 2016178755 A1 | 11/2016 |

OTHER PUBLICATIONS

International Search Report and Written Opinion from International Application No. PCT/US2015/034051 dated Nov. 3, 2015.
International Search Report and Written Opinion from International Application No. PCT/US2015/034070 dated Feb. 1, 2016.
International Search Report and Written Opinion from International Application No. PCT/US2015/034072 dated Nov. 2, 2015.
Bosch, Marcos Ramos, "New Sandwich Composites: For Lightweight Construction in the Automotive Industry," JEC Magazine #45, Nov.-Dec. 2008, Retrieved Nov. 22, 2016.
"Tough Sandwich Design Lightens Load Floor in Crossover SUV," Composites Technology, Jun. 1, 2008, Retrieved Nov. 22, 2016.
"Araldite, Solutions or Automotive Mass Production," Huntsman Advanced Materials Flyer, 2014, pp. 1-2.
"Araldite FST 40002/40003 FST Composite System for Aerospace Interior," Huntsman Advanced Materials Flyer, 2014, pp. 1-2.
"Araldite FST 40004/40005 FST Composite System for Railway," Huntsman Advanced Materials Flyer, 2016, pp. 1-2.
Restriction Requirement for U.S. Appl. No. 15/311,606 dated Jun. 7, 2018.
Restriction Requirement for U.S. Appl. No. 15/311,703 dated Jun. 27, 2018.
Non-Final Office Action for U.S. Appl. No. 15/311,703 dated Sep. 18, 2018.
Non-Final Office Action for U.S. Appl. No. 15/311,271 dated Nov. 19, 2018.
Restriction Requirement for U.S. Appl. No. 15/311,271 dated Aug. 28, 2018.
Notice of Allowance for U.S. Appl. No. 15/311,703 dated Mar. 5, 2019.
Notice of Allowance for U.S. Appl. No. 15/311,606 dated Jan. 23, 2019.
Restriction Requirement for U.S. Appl. No. 15/560,831 dated Apr. 2, 2019.

* cited by examiner

REINFORCED COMPOSITE STRUCTURE

CROSS-REFERENCE TO RELATED APPLICATIONS

This application claims priority to U.S. Provisional Application No. 62/007,614 filed on 4 Jun. 2014, the disclosure of which is incorporated herein, in its entirety, by this reference.

This application claims priority to U.S. Provisional Application No. 62/007,632 filed on 4 Jun. 2014, the disclosure of which is incorporated herein, in its entirety, by this reference.

This application claims priority to U.S. Provisional Application No. 62/007,652 filed on 4 Jun. 2014, the disclosure of which is incorporated herein, in its entirety, by this reference.

This application claims priority to U.S. Provisional Application No. 62/007,670 filed on 4 Jun. 2014, the disclosure of which is incorporated herein, in its entirety, by this reference.

This application claims priority to U.S. Provisional Application No. 62/007,685 filed on 4 Jun. 2014, the disclosure of which is incorporated herein, in its entirety, by this reference.

This application claims priority to U.S. Provisional Application No. 62/108,837 filed on 28 Jan. 2015, the disclosure of which is incorporated herein, in its entirety, by this reference.

BACKGROUND

Composite structures may be used in any number of suitable applications. Generally, composite structure also may be used in various applications where reducing weight to strength ratio is important. For example, composite structures may be used in vehicle chassis, panels for communication equipment, frames or body parts for transportation or vehicles (e.g., bicycles, motor cycles, trucks etc.), agricultural applications (e.g., agricultural equipment), energy related applications (e.g., wind power, solar), satellite applications, aerospace applications, construction materials (e.g., building materials and the like), and consumer products (e.g., furniture, toilet seats, and electronic products among others).

Accordingly, manufacturers and users of composite structures continue to seek improvements thereto.

SUMMARY

Generally, embodiments described herein relate to reinforced composite structures that may have a relatively high bending stiffness at one or more reinforced transition regions (e.g., internal or external corners or bends, joints, holes, changes in thickness, etc.) and may have a relatively light weight, as well as related methods of fabricating such composite structures. For example, a reinforced composite structure (e.g., a composite sandwich that includes one or more reinforced regions) may include at least two composite skins, a transition region, and at least one group of reinforcement fibers proximate to the transition region and configured to provide an increased bending stiffness to the transition region. A composite sandwich that is so reinforced may exhibit a greater bending stiffness in the transition region and/or bulk bending stiffness than a composite sandwich without the reinforcement fibers.

An embodiment includes a reinforced composite structure that includes a first composite skin and a second composite skin. Each of the first and second composite skins includes a plurality of fibers embedded in a polymer matrix. The reinforced composite structure also includes a core positioned between at least portions of the first composite skin and the second composite skin and bonded thereto. Moreover, the reinforced composite structure includes a transition region at which one or more of the first composite skin or the second composite skin transition from a first geometric configuration to a second geometric configuration. The reinforced composite structure also includes a plurality of reinforcement fibers positioned in the transition region and attached to one or more of the first composite skin or the second composite skin.

Embodiments also include a reinforced composite structure having multiple geometric regions. In particular, the reinforced composite structure includes a first composite skin and a second composite skin. Each of the first and second composite skins includes a plurality of fibers embedded in a polymer matrix. Moreover, the reinforced composite structure includes a core positioned between at least portions of the first composite skin and the second composite skin and bonded thereto. In addition, a first geometric region of the multiple geometric regions has a first geometric configuration defined by first portions of the first and second composite skins, and a second geometric region of the multiple geometric regions has a second geometric configuration defined by second portions of the first and second composite skins, and the second geometric configuration is different from the first geometric configuration. The reinforced composite structure also includes a transition region that connects together the first geometric region and the second geometric region. Furthermore, the reinforced composite structure includes a plurality of reinforcement fibers positioned in the transition region and attached to one or more of the first composite skin or the second composite skin.

At least one embodiment includes a method for fabricating a reinforced composite structure. The method includes forming a stack assembly that includes a first resin impregnated fiber sheet, a second resin impregnated fiber sheet, and a core separating the first resin impregnated fiber sheet from the first resin impregnated fiber sheet. The stack assembly also includes a plurality of reinforcement fibers positioned at a first region of the stack assembly and in contact with one or more of the first resin impregnated fiber sheet or the second resin impregnated fiber sheet. The method also includes applying a resin to at least some of the plurality of reinforcement fibers and compressing the stack assembly to form a transition region from at least a portion of the first region of the stack assembly. The transition region connects together a first geometric region and a second geometric region that is different from the first geometric region.

Features from any of the disclosed embodiments may be used in combination with one another, without limitation. In addition, other features and advantages of the present disclosure will become apparent to those of ordinary skill in the art through consideration of the following detailed description and the accompanying drawings.

BRIEF DESCRIPTION OF THE DRAWINGS

For better understanding, the like elements have been designated by like reference numbers throughout the various accompanying figures. It is noted that figures may not be to scale. Understanding that these drawings depict only typical embodiments of the invention and are not therefore to be considered to be limiting of its scope, the embodiments of the invention will be described and explained with additional specificity and detail through the use of the accompanying drawings in which.

DETAILED DESCRIPTION

Figure 1:
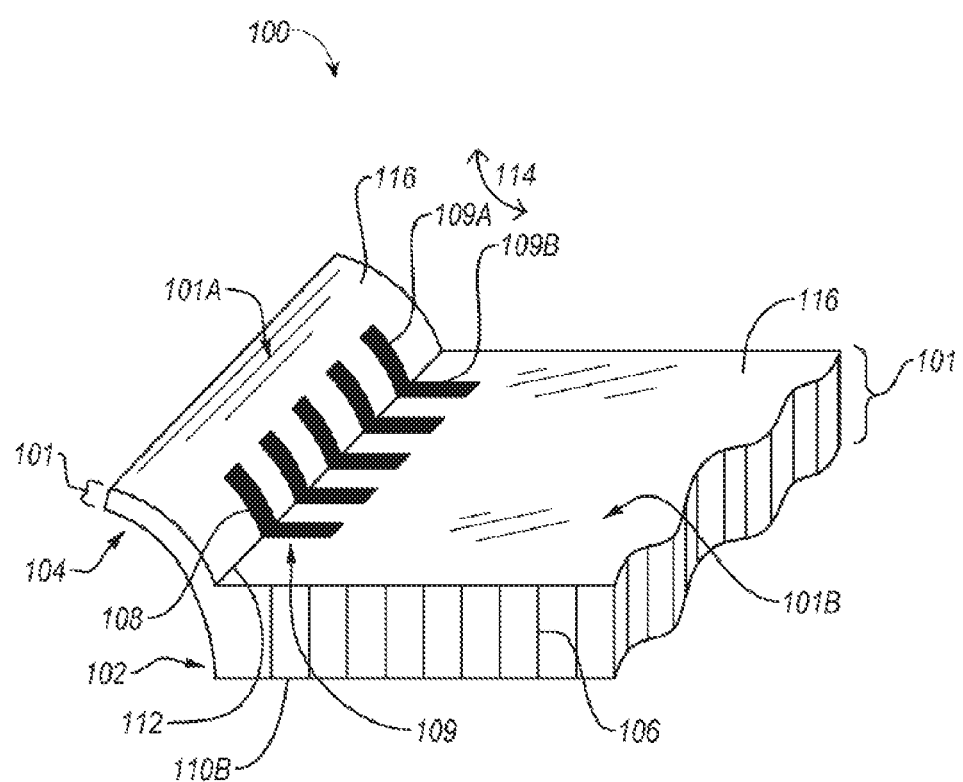
FIG. 1 is a perspective view of a reinforced composite structure reinforced with aligned groups of reinforcement fibers in a substantially parallel pattern near a transition region, according to an embodiment.

Generally, embodiments described herein relate to reinforced composite structures that may have a relatively high bending stiffness at one or more reinforced transition regions (e.g., internal or external corners or bends, joints, holes, changes in thickness, etc.) and may have a relatively light weight, as well as related methods of fabricating such composite structures. For example, a reinforced composite structure (e.g., a composite sandwich that includes one or more reinforced regions) may include at least two composite skins, a transition region, and at least one group of reinforcement fibers (e.g., aligned fibers or randomly oriented fibers) proximate to the transition region and configured to provide an increased bending stiffness to the transition region. A composite sandwich that is so reinforced may exhibit a greater bending stiffness in the transition region and/or bulk bending stiffness than a composite sandwich without the reinforcement fibers.

In some embodiments, composite skins may include a polymer matrix (e.g., a solidified or cured polymer resin) and a plurality or sheet of fibers (e.g., a randomly oriented discontinuous carbon fiber sheet) embedded in the polymer matrix. Generally, a cured or solidified polymer resin may be substantially completely cured or solidified or partially cured or solidified (e.g., such that the polymer resin remains at least partially viscous). Furthermore, after curing and solidifying, the polymer resin may form suitably strong bond with one or more components or elements of the composite sandwich (e.g., with the fiber sheet(s), the core, or the group(s) of reinforcement fibers). In at least one embodiment, when solidified or cured, the polymer resin provides structural rigidity and/or support for the composite sandwich.

Generally, composite structures (e.g., composite sandwiches) may be used as or may form any number of suitable components (composite components) or elements in any number of devices and/or structures. For example, a reinforced composite structure may be used as a component in a vehicle, such as an automobile (e.g., a structural or frame component, a panel, etc.). In some embodiments, the reinforced composite structure may be used in furniture, flooring, etc. In any event, the reinforced composite structure may be used as a structural and/or non-structural component in various applications.

In one or more embodiments, a reinforced composite structure may include a composite sandwich having at least one transition region reinforced (e.g., stiffened) with one or more groups reinforcement of fibers. For example, a reinforced composite structure may have at least one first composite skin, at least one core, at least one second composite skin substantially on the opposite side of the core from the first composite skin, and at least one reinforced transition region (e.g., stiffened) that may be reinforced with reinforcement of fibers. In one or more embodiments, a reinforced composite structure may have at least one composite skin, at least one core, and at least one reinforced transition region (e.g., stiffened) with reinforcement of fibers (e.g., that may have any number of suitable arrangements and/or grouping).

Transition regions may include one or more changes in or transitions between geometries of adjacent region (e.g., from at least one geometric configuration to at least one other geometric configuration or a plurality of geometric configurations, such as changes in thicknesses, shapes, orientations, etc.). Transition regions may include one or more imaginary bend lines or points about which the adjacent regions may have different orientation(s) relative to one another. Additionally or alternatively, in an embodiment, transition regions may include corners or bends (e.g., inside, outside, or compound corners) having gradual or sharp curvature changes, holes or gaps, or changes in dimension such as thickness of and/or between one or more layers (e.g., composite skins, core, insert, etc.) of a composite sandwich, etc.

In some embodiments, the dimension or thickness changes of the transition region may be proximate to an insert associated therewith, such as proximate to a metal insert therein or thereon. The transition region may include at least one continuous change in curvature or a discontinuous change in curvature. During use, the transition region of the composite sandwich may undergo greater stress loads (e.g., compressive or tensile) than other regions of the reinforced composite structure. In one or more embodiments, the reinforced composite structure may have at least one transition region reinforced with one or more of groups (e.g., bundles, arrays, strips, etc.) of reinforcement fibers. The one or more groups of reinforcement fibers may provide a greater resistance to stresses in the transition region than composite structures formed without the reinforcement fibers.

In some embodiments, the reinforced composite structure may include a metal insert. For example, a reinforced composite structure, planar or curved, may include a composite sandwich having a thicker first portion, a thinner second portion, and a transition region connecting the first portion to the second portion. The metal insert may be attached at the thinner second portion of the composite sandwich, and may make up at least some of the thickness difference between the thinner second portion and the thicker first portion of the composite sandwich. In some embodiments, the reinforced composite structure having the metal insert may also include a plurality of reinforcement fibers (e.g., arranged randomly, in groups, in one or more arrays, in bundles, etc.). For example, the reinforcement fibers may be arranged to form a two dimensional pattern, which may be attached to the composite sandwich near the transition region to stiffen the transition region and/or thinner second portion of the composite structure.

FIG. 1 is an isometric view of a reinforced composite structure 100 that include multiple geometric regions or multiple portions with different geometric configurations and a transition region 114 connecting two or more geometric regions or portions with different geometric configurations. In particular, the reinforced composite structure 100 may include a first geometric region 101A with a first geometric configuration (e.g., shape, thickness, etc.), and a second geometric region 101B with a second geometric configuration that is different from the first geometric configuration. It should be appreciated that, in some embodiments, the geometric configurations of the different geometric regions may be at least in part defined composite skins of the reinforced composite structure, as described below in more detail.

In an embodiment, along the transition region 114 that connect different geometric regions, such as geometric regions 101A, 101B, the reinforced composite structure 100 may be reinforced with one or more discrete groups of reinforcement fibers. As shown, a reinforced composite structure 100 may include a first portion 102, a second portion 104, and a transition region 114 (e.g., a corner region transitioning from a first portion 102 oriented at a nonparallel angle relative to the second portion 104). The transition region 114 may connect the first and the second portions 102, 104. As shown in the illustrated embodiment, the first portion 102 of the composite structure 100 may be thicker than, the second portion 104. The transition region 114 may connect together the second portion 104 and the first portion 102.

In some embodiments, the transition region 114 may be bent or otherwise shaped about a bend line 112 (e.g., the bend line 112 may lie in a plane that is generally parallel to a top surface 116 or a bottom surface (not shown)). In at least one embodiment, the transition region 114 may be defined at least in part by change in thickness (e.g., a gradual or abrupt change in thickness such as from a first geometric configuration at the first section to a second geometric configuration with a different thickness than the first geometric configuration). For example, the at least one transition region 114 may include a configuration wherein one or both of the first composite skin and the second composite skin, either separately or in combination, change geometry from the first geometric configuration to the second geometric configuration (e.g., bend from a first angle to a second angle, change thickness from a first thickness to a second thickness).

The reinforced composite structure 100 may also include a plurality of reinforcement fibers 108 (arranged in any number of suitable arrangements as described herein) attached to one or more of the top surface 116 or the bottom surface (not shown) at the transition region 114. As described below in more detail, a group of reinforcement fibers 108 may form or define one or more patches 109. That is, for example, the reinforcement fibers 108 may be distributed in patches 109 instead of continuous or uniform distribution at the transition region 114 (e.g., the transition region 114 may have no reinforcement fibers between the patches 109). Alternatively, the reinforcement fibers 108 may be distributed generally uniformly along the transition region 114. It should be appreciated that the reinforced composite structure may include any number of patches 109, which may be spaced apart at any suitable distance. In some embodiments, the reinforcement fiber 108 may form generally two-dimensional patches 109 (e.g., one or more of the patches may include a single layer or multiple layers of reinforcement fibers). Alternatively, the reinforcement fibers 108 may form generally three-dimensional patches 109.

Moreover, one, some, or each of the patches 109 may include first and second patch portions 109A, 109B attached at the transition region 114. More specifically, for example, the first patch portion 109A may be attached and/or may reinforce a first portion of the transition region 114, which may be adjacent to a first portion of composite sandwich 101, and the second patch portion 109B may be attached to and/or may reinforce a second portion of the transition region 114, which may be adjacent to a second portion of the composite sandwich 101 (e.g., generally opposite to the first portion).

In some embodiments, the reinforced composite structure 100 may include the composite sandwich 101, which may include a core 106 positioned between and bonded to first (e.g., top) composite skin 110A and a second (e.g., bottom) composite skin 110B. As discussed in more detail below, the core 106 may be lighter than the composite skins, at least in part due to one or more voids or cavities therein. As shown in FIG. 1, the second portion 104 may have a substantially solid core 106 (e.g., one or more composite skins may be in direct contact to form a monolithic composite skin portion) or in some embodiments may have a shorter core height than the first portion 102, such as due to localized compression of one or more portions of the composite sandwich.), as described in more detail in PCT International Application No. PCT/US15/34070, entitled "Composite Sandwich with High Bending Stiffness" and is filed concurrently herewith, which claims priority to U.S. Provisional Application No. 62/007,614 filed on 4 Jun. 2014 and U.S. Provisional Application No. 62/108,837 filed on 28 Jan. 2015, the disclosure of each of the foregoing applications is incorporated herein in its entirety by this reference.

In some embodiments, the core 106 may extend through at least a portion of the at least one transition region wherein one or more portions of the core may change geometry from first geometric configuration to second geometric configuration, similar or identical to any of the changes in geometric configuration described above (e.g., one or more portions of the core being curved and/or more compressed than adjacent portions of the core). In some embodiments, the composite sandwich (including composite skins and the core) may include a transition region changing geometry from a first geometric configuration to a second geometric configuration.

The core 106 may be a "hard" core including a plurality (e.g., a bundle) of cells, such as those defined between one or more walls of plastic tubes or high density foams. The core may exhibit a high bending stiffness. The "hard" core may exhibit a high energy absorption in a horizontal loading direction along the composite skin. In one or more embodiments, a core blank may be at least partially compressed and/or heating during fabrication to form the core 106 of the composite sandwich. For example, a core blank may be positioned between fiber sheets impregnated with polymer resin, which may be heated and/or compressed together to at least partially soften (e.g., melt) and/or compress the core blank and form the core 106 of the composite sandwich 100. In particular, the fiber sheets together with polymer resin may form the first and second composite skins 110A and 110B of the composite sandwich 101, which are bonded to the core 106 (formed from the core blank). In some embodiments, the core blank may be compressed to different heights or thicknesses to form the core 106 that has correspondingly varied thicknesses at different portions thereof. Hence, in some embodiments, different portions of the composite sandwich 101 may have different thicknesses (e.g., the composite sandwich 101 may have a three-dimensional configuration). Moreover, the composite sandwich 101 may be generally formed as a panel that may have planar and/or nonplanar surfaces.

The core blank or core material and configuration may vary from one embodiment to the next. Generally, a relatively hard core may effectively transfer the full load from one end of the core to the other end of the core. For example, the "hard" core may be formed from a core blank that includes plastic material (e.g., thermoplastic, thermoset, etc.) and may include multiple cells defined by corresponding one or more cell walls (e.g., the plastic material may define a honeycomb-like structure, where the cells may have any number of suitable cross-sectional shapes, such as circular, polygonal, etc.). The core blanks described herein may be an uncompressed precursor to the laminated (e.g., with one or more fiber sheets) and/or compressed cores in the reinforced composite structures disclosed herein. In some embodiments, plastic tubes (e.g., drinking straws, which may include low cost material, and may be relatively light-weight) or other structures materials may be combined together or integrally formed to collectively form the core blank (e.g., each straw may define a corresponding cell of the core and adjacent cores may define additional cell in the gaps or spaces therebetween). Additionally or alternatively, high density foams and other suitable and/or compressible materials may be included in the core blank (e.g., material that may be porous or may include small or micro pores or cells, which may have three-dimensional arrangement within the material). In some embodiments, one region of a cell blank may include cells having different dimensions (e.g., diameters and/or heights) than cells in another region of the same cell blank, such as to provide a desired stiffness or compressibility in a specific region of the core blank or resulting core 106.

In additional or alternative embodiments, one or more portions of the core 106 may also be relative soft, and may include or may be constructed of relatively soft materials, such as paperboards or cardboards or low density foams. The "soft" core may not transfer a full load from one end of the core to the opposite end of the core when a load is applied onto an end of the core, for example, the "soft" core may be formed from paperboards, or cardboards and the like. In some embodiments, the full load means at least 70% of the load applied. In some embodiments, the full load means at least 80% of the load applied. In some embodiments, the full load means at least 90% of the load applied. In some embodiments, the full load means 100% of the load applied. The "soft" core may absorb more energy, vibration, or impact than the "hard" core in a vertical direction substantially perpendicular to the composite skins. For example, the "soft" core may absorb or dampen more sound energy than the "hard" core.

In some embodiments, the composite skins 110A-B may include a polymer matrix and at least partially embedded continuous and/or discontinuous fibers therein (e.g., carbon fibers). According to one or more embodiments, the polymer matrix may be formed from a polymer resin (e.g., an at least partially cured form of). The polymer matrix or polymer resin may include a mixture of components therein, such as one or more thermosets, one or more thermoplastics, one or more hardeners, one or more filler materials, one or more group VIII catalysts, or combinations thereof. For example, the polymer resin or polymer matrix may include a first thermoset such as epoxy and a second thermoset such as polyurethane. The epoxy may make up about 10% to about 40% (e.g., about 25% to about 35%) of the polymer resin by volume, with the polyurethane making up at least a portion of the balance of the polymer resin. The polymer resin may include one or more thermoplastics having a relatively high viscosity, such a polyether ether ketone (PEEK) or polyethylene, for improving resiliency or hardness of the resulting cured composite laminate. In some embodiments, the polymer resin may include one or more of at least one hardener, configured to catalyze curing of one or more components of the polymer resin. In some embodiments, the polymer resin may include at least one Group VIII metal material, such as Cobalt, Nickel, or Iron to act as a chemical mediator in the reaction of one or more components of the polymer resin (e.g., the epoxy). In some embodiments, the polymer resin may include at least one filler material to reduce shrinkage. The polymer resins disclosed herein may have relatively short cure times (e.g., about 5 minutes or less) while exhibiting relatively little shrinkage (e.g., less than about 3%). For example, the volume shrinkage between the polymer resin and the cured polymer matrix may be below about 3%. As used herein, the term "cure" or "cured" includes the meanings at least partially or fully cure or cured.

Suitable polymer resins, components thereof, and volumes of the components may include any of those described in PCT International Patent Application No. PCT/US15/34051, entitled "Multicomponent Polymer Resin, Methods for Applying the Same, and Composite Laminate Structure Including the Same" and filed concurrently herewith, which claims priority to U.S. Patent Application No. 62/007,632 filed on Jun. 4, 2014 and U.S. Patent Application No. 62/108,837 filed on 28 Jan. 2015, the disclosure of each of which is incorporated herein, in its entirety, by this reference.

The polymer matrix, such as the mixture of polyurethane and epoxy, may be water resistant after curing. Generally, a first thermoset (e.g., polyurethane) may be at least partially water permeable, while another thermoset (e.g., epoxy) may be substantially water resistant. Therefore, the polymer matrix may be water resistant or sealed from water when the water resistant thermoset is used in sufficient quantity. In some embodiments, the polymer resin may enable formation of polyurethane foams (e.g., micro-foams), which may enhance the bonding of the composite skins to the core of the composite sandwich.

It was found that the composite skins formed according to one or more embodiments described herein do not peel off from the "hard" core, such as plastic tubes. In some embodiments, a selected amount of foaming (e.g., formation of micro-foams) may be desired in the polymer resin and resulting cured polymer matrix. For example, too much foaming may cause the polymer resin to cure too quickly, lose water resistance (e.g., cause excess porosity such that the epoxy in the polymer resin cannot prevent water from passing therethrough), and/or to have compromised strength. Too little foaming may cause the polymer resin to form a weaker bond to the core. As the polyurethane in the polymer resin foams, the foam may infiltrate into the cells or tubes of the core blank or core from the open ends inward thereby forming a mechanical bond thereto upon curing. In an embodiment, the polymer matrix may include a mixture of epoxy and polyurethane foams, which may form during curing due to condensation or steam forming in the liquid mixture of epoxy and polyurethane. In an embodiment, a core may be affixed to at least one of the first composite skin or the second composite skin via foam (e.g., micro-foam) formed from the polymer resin and least partially extending into the one or more of the plurality of cells. In some embodiments, a first polymer matrix may be made of a first polymer resin and a second polymer matrix may be made of a second polymer resin wherein the first and second polymer resins are different. For example, a first polymer matrix may include a polymer resin having a greater amount of epoxy in an epoxy polyurethane mixture than the second polymer resin. In some embodiments, the first polymer matrix and the second polymer matrix may include substantially the same or identical (cured) polymer resin therein.

As described above, the configuration and/or composition of the first and/or second composite skins 110A-110B (e.g., the composition of the polymer matrix and/or reinforcement fiber) may vary from one embodiment to the next. Generally, the fibers embedded in the resin of the first and/or second composite skins 110A-110B may be continuous (e.g., fibers that may extend between edges of the composite skins, such as woven sheets) and/or discontinuous or short fibers. In some embodiments, the discontinuous fibers may be recycled fibers from waste fibers, such as from a resin transfer mold ("RTM") to significantly reduce the material cost. Also, the fibers may include any number of suitable materials (e.g., the fibers may be carbon fibers, glass fibers, etc.). In some embodiments, the first and/or second composite skins 110A-110B may additionally or alternatively include oriented or aligned continuous fibers embedded in the polymer matrix. Moreover, the fibers (continuous and/or discontinuous) may be arranged together to define a fiber sheet. In some embodiments, the fibers in the fiber sheet may be overlapped and/or weaved together. Alternatively, the fibers may be loosely positioned together and/or matted together to define the fiber sheet. In an embodiment, loosely positioned fibers may be attached or bonded together to form the fiber sheet.

In an embodiment, carbon fibers for the groups of reinforcement fibers of the fiber sheets (e.g., the composite skins) may be supplied in groups or bundles (e.g., strips, sheets, etc.), such as by TORAY 1 k, 3 k, 6 k, 12 k, 24 k, and 48 k groups. Each group of carbon fibers may also include some binders on the outer surface of the fibers, such that the fibers can be bound together when the carbon fibers are heated to an elevated temperature.

The reinforcement fibers of about the same length may be produced from continuous fibers in a fiber machine. The fiber machine may be configured to move back and forth automatically to deposit the fibers over a composite on a table in any desired pattern. The fiber machine may also be configured to cut the continuous fibers into about the same length. For example, the fibers may be long enough to stiffen or strengthen composite structures. The fibers may be at least 100 mm long, such as about 180 mm long, about 100 mm long to about 1 m long, about 150 mm long to about 500 mm long, about 200 mm long to about 300 mm long, or about 100 mm long to about 400 mm long. The length of the individual fibers in a fiber sheet or composite skin or the fiber sheet or composite skin may vary or be substantially identical.

To form a composite sandwich with stiffened transitions regions, additional reinforcement fibers, such as one or more groups of reinforcement fibers (e.g., discrete groups of randomly oriented fibers) may be positioned over a region of stack assembly that may be formed into the transition region of the composite structure or sandwich to form a reinforced composite structure. Generally, the stack assembly may include resin impregnated fiber sheets and a core blank positioned therebetween. In some embodiments, as described above, the stack assembly may include reinforcement fibers positioned in the transition regions.

The stack assembly may be substantially flat prior to processing or molding. In some embodiments, the stack assembly may include polymer resin impregnated fiber sheets or layers ("prepregs"). In one or more embodiments, the stack assembly may include resin impregnated fiber sheets (e.g., to fabricate the resin impregnated fiber sheets, a polymer resin may be sprayed, spread, rolled, etc., on the fiber sheet). The stack assembly may include a core between two resin impregnated fiber sheets.

The oriented or aligned continuous fibers, such as woven fibers, may have a higher stress resistance than the discontinuous fibers and may be cosmetically more appealing than the randomly oriented discontinuous fibers, but at a higher cost. The composite skin including the oriented continuous fibers may not stretch prior to curing at all or as much as the composite skin including randomly oriented discontinuous fibers. The ability to stretch may allow the composite sandwich to be formed into any shape, such as when heated to soften the core and/or when pressed in a mold. The fiber sheet of the composite skin including oriented continuous fibers may not absorb as much polymer resin as the composite skin including randomly oriented discontinuous fibers.

The groups of reinforcement fibers 108 may be arranged or grouped to form reinforcement regions along the transition region 114. For example, the reinforcement fibers 108 include the same or similar materials as any of the fibers or fiber sheets disclosed above. For example, the groups of reinforcement fibers 108 may include randomly oriented discontinuous fibers or continuous oriented fibers, such as carbon or glass fibers. The groups of reinforcement fibers 108 may exhibit the same thickness as the fiber sheets of the composite skin(s) or may exhibit a greater or smaller thickness. For example, the groups of reinforcement fibers 108 may be about 25% to about 200% of the thickness of the fiber sheet in an adjacent composite skin, such as about 25% to about 100%, about 35% to about 75%, about 40% to about 50%, about 100% to about 200%, about 120% to about 180%, about 140% to about 160%, about 50%, about 75%, about 100%, about 125%, about 150%, or about 200% of the thickness of the fiber sheet in an adjacent composite skin.

The groups of reinforcement fibers 108 may be positioned on or under the first composite skin 110A and generally aligned with respect to a loading or stress vector of the composite skin or composite sandwich such that the composite skin or composite sandwich exhibits a relatively high bending stiffness compared to a composite skin or composite sandwich without the groups of reinforcement fibers 108. In an embodiment, the groups of reinforcement fibers 108 may exhibit a substantially linear form (e.g., strips), a substantially round form (e.g., patches), a substantially polygonal form (e.g., square patches or rectangular strips), and irregular forms (e.g., having no repeating or definable angles or constantly curving sides), radial formations (e.g., a plurality of strips emanating from a central point), or combinations of any of the foregoing. In some embodiments, groups of reinforcement fibers 108 may be positioned in one or more patterns or relationships with respect to one or more adjacent groups of fibers 108, such as substantially parallel to each other or substantially linearly aligned.

In some embodiments, the reinforcement fibers 108 may be positioned across and at least partially overlapping transition region 114 (e.g., an intersection or corner) of a composite skin or laminates. For example, at least some of the reinforcement fibers 108 may be aligned to be substantially perpendicular to the bend line 112 of the transition region 114. In some embodiments, at least some of the reinforcement fibers 108 may be positioned substantially parallel to the bend line 112 of the transition region 114, such as extending there along, in a linear series parallel to and overlapping the bend line 112. In some embodiments, at least some of the reinforcement fibers 108 may be positioned at an oblique angle to the bend line 112 of the transition region 114.

The relative position and/or alignment of the reinforcement fibers 108 may help stiffen the transition region 114 or increase the bending stiffness of the reinforced composite structure near the transition region 114, such that the reinforced composite structure 100 can withstand a high bending load (e.g., opposing portions of the composite sandwich 101 may be subjected to a bending load about the bend line 112). In some embodiments, at least some of reinforcement fibers 108 may also be oriented at an obtuse or acute angle relative to the bend line 112 and/or relative to Y-axis. For example, at least some of the reinforcement fibers 108 may have an angle of less than 90 degrees, some of reinforcement fibers 108 may have an angle between 90 degrees and 180 degrees, and some of the reinforcement fibers may have an angle of about 90 degrees. In some embodiments, a group of reinforcement fibers 108 may be aligned at various angles from the bend line 112. For example, the angles from the X-axis may vary from 10° C. to 90° C., or vary from 90° C. to 170° C. In embodiments having groups of reinforcement fibers positioned at a mixture of angles from the X-axis, the reinforced composite (sandwich) structure may withstand stresses from a plurality of directions, rather than only one direction with uniformly aligned groups of reinforcement fibers.

In embodiments utilizing oriented or aligned fibers (e.g., woven carbon fiber sheets) in the groups of reinforcement fibers 108, the individual oriented fibers may be positioned such that the aligned fibers may be perpendicular to the transition region 114 (e.g., fibers extend across the bend line 112 rather than parallel thereto). Moreover, at least some of the reinforcement fibers 108 may be aligned relatively parallel, perpendicular, or oblique relationship to the fibers in the first and/or second composite skins 110A-110B. In some embodiments, the reinforcement fibers 108 such as randomly oriented discontinuous fibers may be used to reinforce the composite sandwich 101. The randomly oriented discontinuous fibers may withstand bending stressed in any direction as opposed to aligned fibers which are configured to withstand bending stresses in specific discrete directions.

As described above, the reinforcement fibers 108 may be arranged in groups and/or may define one or more shapes or patches (e.g., patches 109) that may reinforce the transition region 114. Generally, the outer perimeter of the patches 109 may have any suitable orientation relative to the transition region 114, such as orientations described above in connection with reinforcement fibers 108. Furthermore, the reinforcement fibers 108 that form the patches 109 may have any number of suitable orientations within each of the patches 109 and/or relative to the outer perimeter or shapes of the patches.

While in the illustrated embodiment the reinforced composite structure 100 is shown as having patches 109 of reinforcement fibers 108 on the top surface 116, in some embodiments (not shown), the reinforced composite structure 100 may additionally or alternatively include reinforcement fibers attached to a bottom surface (e.g., associated with composite skin 110B) to reinforce the transition region 114. For example, reinforcement fibers may be aligned substantially parallel to each other and also to be substantially perpendicular to the transition region or to the bend line 112 thereof.

Figure 2A:
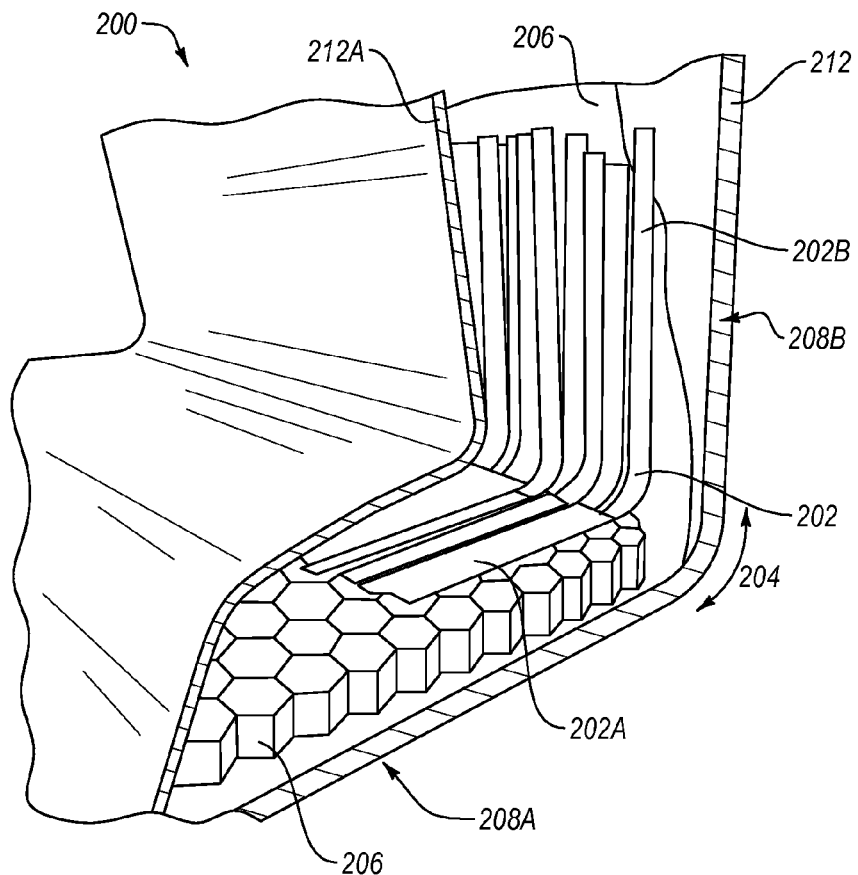
FIG. 2A is a perspective view of a stack assembly for fabricating a reinforced composite structure, according to an embodiment.

In some embodiments, a composite structure may include one or more sidewalls having one or more transition regions therein and/or therebetween. FIG. 2A is an exploded perspective view a reinforced composite structure 200 that may be reinforced with reinforcement fibers 202 at a transition region 204. The reinforced composite structure 200 may include a first sidewall 208A and a second sidewall 208B connected together by a transition region 204. The transitions region 204 may be a corner region as shown or, in other embodiments, may exhibit one or more changes in shape, thickness, etc. The first sidewall 208A and the second sidewall 208B may be made of or include one or more component parts such as one or more portions of a composite sandwich.

In particular, for example, the composite sandwich of the reinforced composite structure 200 may include first and second composite skins 212A, 212B, and a core 206 positioned therebetween and bonded thereto. The composite skin 212A or 212B may include two or more composite laminates that are formed from separate fiber sheets, which may increase the thickness of the composite skin. The composite sandwich may include a NCF or a woven fabric to increase pull out load of the composite structure having the same. The reinforced composite structure 200 also may include reinforcement fibers 202 and in some cases, an insert (e.g., a metal insert) may be included in a composite sandwich. The first sidewall 208A and the second sidewall 208B may include different portions of the same component(s). For example, the first composite skin 212A may form a portion of the first sidewall 208A, the transition region 204, and the second sidewall 208B, with the transition region 204 extending between the first and second sidewalls.

In some embodiments, reinforcement fibers 202 may be positioned at (e.g., in direct contact with or bonded to) transition region 204, such as spanning across at least a portion of a transition region 204, to reinforce the transition region 204. The groups of reinforcement fibers may be located on top of (e.g., at an outer surface of) the first and/or second composite skins 212A, 212B or alternatively or additionally may be located between the first and second composite skins 212A, 212B, such as between the core 206 and the first composite skin 212A.

In some embodiments, the second sidewall 208B may be substantially solid and/or may include substantially only the composite skins 212A-212B without a core therebetween. Moreover, reinforcement fibers 202 may be positioned between the first and second composite skins 212A, 212B or near one or more outer surfaces thereof. Alternatively, in some embodiments, the core 206 may extend substantially entirely through the composite sandwich, such as through the first sidewall 208A, the second sidewall 208B, and the transition region 204 (e.g., corner region) therebetween.

The transition region 204 may include a bend line 210 about which the first and second side walls 208A, 208B may be bent and/or oriented relative to each other. Generally, as described above, the bend at the transition region 204 may have any number of configurations (e.g., may form a substantially sharp inner corner, may have a radius, may include an irregular transition, etc.). Hence, the bend line 210 may generally correspond to a location about the first and second sidewalls 208A, 208B are oriented relative to each other.

In some embodiments, the first sidewall 208A may have the same thickness as the second sidewall 208B. In alternative or additional embodiments, the first sidewall 208A may have a different thickness than the second sidewall 208B (e.g., having a portion of the core 206 compressed differently or to a different thickness). In some embodiments, the first composite skin 212A may have the same thickness as the second composite skin 212B. In other embodiments, the first composite skin 212A may have a different thickness from the second composite skin 212B. The difference in thickness may transition from a first thickness to a second thickness in the transition region.

The reinforced composite structure 200 may be formed by reinforcing or stiffening a composite sandwich structure by attaching at least one group of reinforcement or reinforcing fibers 202 at (e.g., spanning over or surrounding) the transition region 204. The reinforcement fibers 202 may span across the transition region 204. The transition region 204 may exhibit form or shape changes, such as one or more changes curvature and/or thickness change or changes.

Figure 2B:
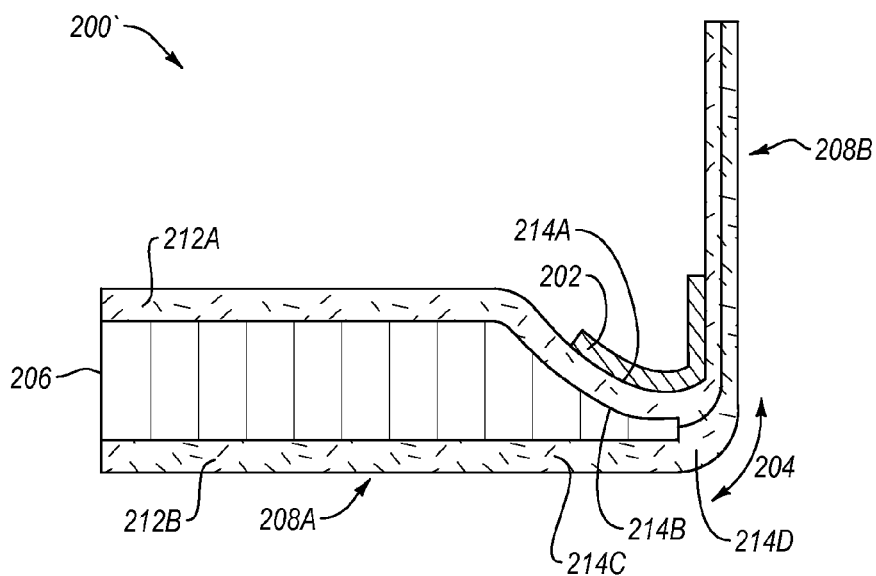
FIG. 2B is a side view of the reinforced composite structure fabricated from a stack assembly, according to an embodiment.

In some embodiments, the transition region 204 may exhibit a high degree of form or shape change(s), one or more angles of about 45 degrees or more or changes in thickness of about 50% or more relative to one sidewall to another sidewall. The reinforcement fibers 202 may extend over at least a portion of the first sidewall 208A of the reinforced composite structure 200, across the transition region, and over at least a portion of the second sidewall 208B. The reinforcement fibers 202 may include a first portion 202A attached to the first sidewall 208A and a second portion 202B attached to the second sidewall 208B, with intermediate portions extending therebetween. In some embodiments, the first portion 202A and the second portion 202B may be aligned to be substantially perpendicular (as shown in FIGS. 2A-2B), parallel, or oblique to each other. As described above, the reinforcement fibers 202 may be arranged in groups or patches. It should be appreciated that the patches formed by the reinforcement fibers 202 may have any suitable shapes and/or alignments (e.g., the alignments for the reinforcement patches may be similar to or the same as the alignment of the reinforcement fibers 202).

In some embodiments, the reinforcement fibers 202 may be disposed between the core 206 and the first composite skin 212A, as shown in FIG. 2A and/or between the core 206 and the second composite skin 212B (not shown). In some embodiments, the reinforcement fibers may be disposed over and/or on the first composite skin 212A, as shown in FIG. 2B. In some embodiments, the groups of reinforcement fibers 202 may be positioned over the second composite skin 212B. In some embodiments, one or more groups of reinforcement fibers 202 may be disposed between the core 206 and the first or second composite skin 212A or 212b, over the first composite skin 212A, over the second composite skin 212B, or combinations of the foregoing. As used herein, the term "over" includes contacting, attached to, or affixed to.

The reinforced composite structure 200 of FIG. 2A may be assembled (e.g., positioned in a mold and/or press) and formed into a unitary reinforced composite structure, such as by pressing at least a portion thereof in a mold and/or heating one or more portions thereof to at least partially cure the composite skins (e.g., polymer resin in one or more carbon fiber sheets).

FIG. 2B is a side view of reinforced composite structure 200' reinforced with aligned groups of reinforcement fibers 202 near a transition region 204 similar to FIG. 2A. As shown, there may be a transition region 204 (e.g., corner and thickness change) connected to and between the first sidewall (e.g., composite sandwich) 208A and the second sidewall (e.g., composite skin) 208B. A combined composite skin (e.g., having no core) may include the first composite skin 212A and the second composite skin 212B. The combined composite skin of the second sidewall 208B is depicted as including two separate and distinct composite skins (e.g., the cured composite skins are bound together but separate). However, in some embodiments, the second sidewall 208B may include a single composite skin, which may exhibit substantially no division or parting in the fiber sheet(s) thereof.

For example, pressing and curing adjacent resin impregnated fiber sheets may result in a substantially unitary polymer matrix with fiber embedded therein. In some embodiments, a thin layer of polymer resin may be disposed between the first composite layer 212A and the second composite layer 212B in the second sidewall 208B in either of a cured and/or uncured state. In some embodiments, a core 206 (e.g., the same core 206 as in the first sidewall 208A or a different core 206) may be disposed between the first composite layer 212A and the second composite layer 212B in the second sidewall 208B. In some embodiments, the core 206 may extend through at least a portion of the transition region 204 between the first sidewall 208A and the second sidewall 208B. As shown in FIG. 2B, the core 206 may taper and/or terminate in one or more portions of the reinforced composite structure 200', such as in the first sidewall 208A, the second sidewall 208B, or the transition region 204 (as shown). In some embodiments, the core 206 may extend through at least a portion of the transition region 204 between the first sidewall 208A and the second sidewall 208B.

As shown, the reinforcement fibers 202 may be in one or more locations on a composite structure. For example, the groups of reinforcement fibers 202 may be positioned 214A on top of the first composite skin 212A (FIG. 2B), at a location 214B between the first composite skin 212A and the core 206 (FIG. 2A), at a location 214C between the core 206 and the second composite skin 212B, or at a location 214B which is under (e.g., on an outer surface) the second composite skin 212B. The locations 214A-214D may extend along the length or lateral dimension of the reinforced composite structure 200'. The reinforcement fibers 202 may be aligned in different directions (e.g., perpendicular or angled from a bend line of the transition region 204, as disclosed above, depending upon the loading condition for a particular application. The reinforcement fibers 202 associated with the reinforced composite structure 200' may provide added stiffness or rigidity to resist forces on one or more of the first sidewall 208A or second sidewall 208B which may result in torque, stress, or strain, on the transition region 204.

Figure 3A:
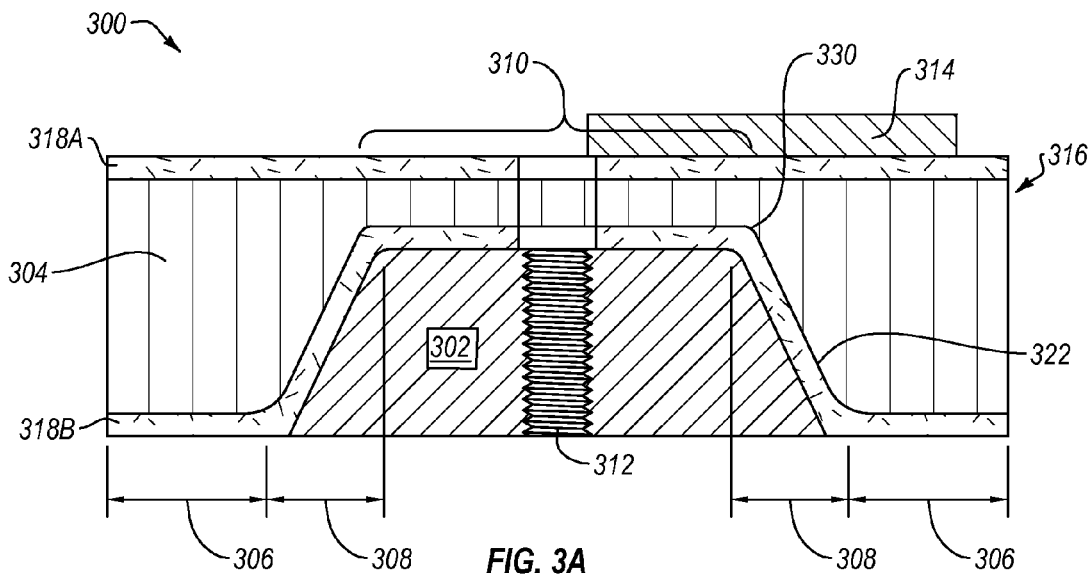
FIG. 3A is a cross-sectional view of a reinforced composite structure including a metal insert and a fiber reinforcement near a transition region, according to an embodiment.

In some embodiments, the transition region may include change in thickness of one or more portions of the composite sandwich or reinforced composite structure. FIG. 3A is a cross-sectional view of a reinforced composite structure 300 including an insert, such as metal insert 302, and a fiber reinforcement (e.g., one or more group of reinforcement fibers 314) proximate to a transition region 308. The reinforced composite structure 300 may include a composite sandwich (e.g., composite plate or sheet) 316 including a first composite skin 318A, a second composite skin 318B, and a core 304 therebetween. The first composite skin 318A, second composite skin 318B, and a core 304 may be similar or identical to any composite skin or core disclosed herein, including any composition, dimension, or property thereof.

The composite sandwich 316 may include one or more thicker first sections 306, one or more thinner second sections 310, and one or more transition regions 308 connecting one or more of the first sections 306 to one or more of the second sections 308. The overall composite sandwich 316 may be substantially planar (or in some embodiments non-planar as shown in FIGS. 2A-2B) with one or more transition regions 308 including and indicated by changes of thickness of one or components therein. The transition region 308 of the composite sandwich 316 may have a continuous or discontinuous (e.g., stepped) change in thickness. In some embodiments, the corners 330 at the termini of the transition region(s) 308 may be rounded to spread stress concentration across a larger area, which may reduce the chances of breakage at a discrete point such as a sharp corner. As shown in FIG. 3A, the transition region 308 may have a constant or variable slope 322. In some embodiments, the transition region 308 may constantly or variably curve. In some embodiments, the transition region 308 may have discontinuous changes in thickness, such as steps (not shown).

The reinforced composite structure 300 may include a metal insert 302, such as to support the composite sandwich 316 in one or more regions thereof, or to provide an attachment point for a fastener or another structure. The metal insert 302 may have a substantially complementary geometry to the change in thickness of the composite sandwich 316 (e.g., fitting in or bonded into a pocket or slope formed in the composite sandwich 316) which may make up at least some the difference in thickness between the thicker first section 306 and the thinner second section 310.

In some embodiments, the metal insert 302 may be formed of any metal or alloy, such as aluminum, steel, magnesium, steel, titanium, etc. The metal insert 302 may be attached to the thinner second section 310 by an adhesive and/or bonded to the resin polymer and/or may be fastened with one or more fasteners, such as a bolt (not shown). In an embodiment, the metal insert 320 may include a fastening hole 312 (e.g., a threaded hole) to fasten the bolt. In some embodiments, the metal insert 302 may alternatively or additionally be attached to the first section 306, such as by an adhesive or fastener. In some embodiments, a non-metal insert may be used instead of the metal insert 302. Suitable materials for the non-metal insert may include plastics, wood, ceramics, fluid cells, etc. The metal insert may be positioned externally to the composite skins 318A and 318B, such as before or after forming the composite sandwich. In such embodiments, faster throughput times and reduced costs may be achieved as compared to composite structures having metal inserts disposed inside of the composite skins layers. However, in some embodiments, the metal insert may be positioned internal to the composite skins.

For example, the composite skin 318B may form a pocket and/or may at least partially surround the metal insert 302. Moreover, the pocket or indent that accommodates the metal insert 302 may be formed in the core 304 (e.g., the core 304 may at least partially surround the metal insert 302 and may be separated therefrom by the composite skin 318B). In some embodiments, the pocket or recess defined at least by the composite skin 318B may locate and/or orient the metal insert relative to the composite skin 318B and/or relative to the core 306 (e.g., the recess may have one or more tapered sidewalls). In some embodiments, forming a recess including at least a portion of the core 306 may produce a transition region, such as transition region 308 between a portion of a composite sandwich 316 that has a first thickness and another portion of the composite sandwich 316 that has a second thickness (greater than the first thickness). The recess in composite sandwich may be formed from a mold independent from the insert or may be formed by pressing the insert into the uncured composite sandwich. The insert may be positioning in the recess after the composite sandwich has been cured or prior to curing.

The reinforced composite structure 300 may alternatively or additionally include reinforcement fibers 314 attached to the top surface of a composite sandwich 316, such as on the composite skin 318A. The reinforcement fibers 314 and/or arrangement thereof may be similar or identical to any of reinforcement fibers disclosed herein, including but not limited to the type of fiber (e.g., carbon, glass, continuous or discontinuous) or form of agglomeration of fibers (e.g., randomly oriented sheet or woven sheet). The reinforcement fibers 314 may cover (e.g., extend substantially completely across) the transition region 308 of the composite sandwich 316 and may extend to cover a portion of the second section 310 and/or a portion of the first section(s) 306 of the composite sandwich 316. In some embodiments, the groups of reinforcement fibers 314 may be added to the composite sandwich during initial formation of the composite sandwich (e.g., integrally formed with the components of the composite sandwich 316). In some embodiments, the reinforcement fibers 314 may be added (e.g., attached) to composite sandwich 316 after the composite sandwich 316 is formed (e.g., cured). In some embodiments, the reinforcement fibers 314 may be positioned between the metal insert 302 and the composite skin 318B, or between composite skin 318A or 318B and the core 304 of the composite sandwich 316 (not shown).

In some embodiments, the composite sandwich 316 may be formed from a core 304 positioned between and bonded to composite skins 318A and 318B. The composite skins 318A, 318B may include aligned continuous fibers or randomly oriented discontinuous fibers embedded in a polymer matrix. The thinner second section 310 may have a solid composite structure (e.g., include only composite skins) or a shorter core height than the thicker first section 306. Again, the core may include a "hard" core material such as a plurality of polymer cells (e.g., a bundle of polycarbonate tubes or high density foam) with a relatively high bending stiffness. The core may alternatively or additionally include a "soft" core material including cardboard or paperboard, or low density foams, and the like, with a high energy absorption. For example, in an embodiment, a composite sandwich may include one or more cores therein, such as one or more "hard" cores and/or one or more "soft" cores, such as between one or more composite skins (e.g., one or more cores directly adjacent to one another or separated by one or more composite skins therebetween). In an embodiment, the cells of a hard core may be partially filed with a soft core material (e.g., polycarbonate tubes partially filled with paperboard).

In some embodiments, a composite sandwich may be formed with a substantially uniform core blank height and then may heated and/or compressed to form a composite component having a core exhibiting one or more various heights, such as in a desired shape in a mold. The changes in thickness of the composite sandwich 316 may be effected by compressing a core blank to a greater depth in one region than in another region, such as in a mold (e.g., core blank and resin impregnated fiber sheets may be heat and compressed at 5 bars to 10 bars (e.g., about 6 bars) to form the composite sandwich 316). Use of a "hard" core blank, such as a plurality of polycarbonate cells (e.g., plastic straws), may allow the core blank and resulting core to withstand greater compression than use of soft core materials. Further, the "hard" core materials, such as plastic tubes, may additionally be softened or heated (e.g., at least partially melted) during pressing to further conform to the shaped of a mold or a desired core height. In some embodiments, changes in thickness may be due to the absence of a core in one or more portions of the composite sandwich 316. In some embodiments, the changes in the thickness of the composite sandwich 316 may be effected by using a core blank having differing thicknesses in different regions thereof (e.g., irrespective of pressing and/or molding). In some embodiments, the resulting pressed core may exhibit at least one section having a taller core height and at least one section having a shorter core height.

Figure 3B:
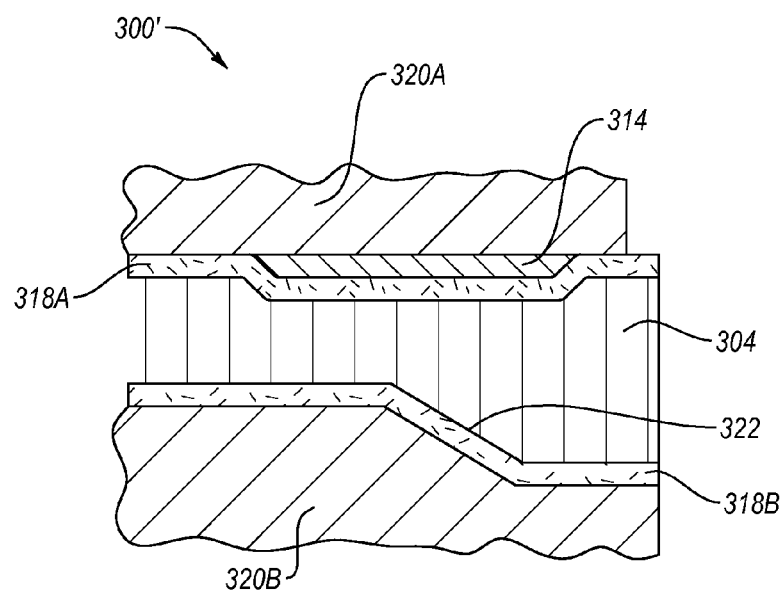
FIG. 3B is a partial cross-sectional view of a reinforced composite structure including a fiber reinforcement near a transition region, according to an embodiment.

In some embodiments, the fibers 314 may be added before the composite sandwich or plate 316 is formed. FIG. 3B is a partial cross-sectional view of a reinforced composite structure 300', including a group of reinforcement fibers 314 near a transition region 308, disposed in a mold 320A-320B. For example, a composite sandwich may include composite skin 318B including a fiber sheet or layer impregnated with a polymer resin (e.g., carbon fiber sheet impregnated with a polyurethane-epoxy polymer resin), a compressed core 304, and top composite skin 318A including a fiber sheet impregnated with the polymer resin (e.g., an additional carbon fiber sheet impregnated with the polyurethane-epoxy polymer resin), as well as the reinforcement fibers 314 having the polymer resin applied thereto (e.g., sprayed or manually applied). The reinforcement fibers 314 may be similar or identical to any of reinforcement fibers and arrangements thereof disclosed herein. In an embodiment, the reinforcement fibers 314 may include finely chopped fibers sprayed from a spray-up lamination system equipped to spray polymer resin and the finely chopped fibers, such from the RS Chop Gun from GRACO® of Minneapolis, Minn., or equivalents thereof.

In some embodiments, to produce a composite sandwich and/or reinforced composite skin, a stack assembly similar or identical to the assembly 200 may be positioned in a mold including an upper mold portion 320A and a lower mold portion 320B. The stack assembly may be pressed and/or heated and subsequently cured (e.g., heated for a time) to form the reinforced composite structure. In an embodiment, the first composite skin 318A may be positioned proximate (e.g., in direct contact with or near to) to the upper mold portion 320A and the second composite skin may be positioned proximate to the lower mold portion 320B (e.g., the upper and lower mold portions 320A-320B may define a mold cavity that compresses and/or shapes the stack assembly to fabricate the reinforced composite structure).

In an embodiment, the core 304 may be positioned adjacent to one or both of the first composite skin 318A or the second composite skin 318B. In some embodiments, one or more groups of reinforcement fibers may be positioned between the core 304 and one or more of the first composite skin 318A or the second composite skin 318B. In some embodiments, one or more groups of reinforcement fibers may be positioned between the upper mold portion 320A and the first composite skin 318A and/or between the lower mold portion 320B and the second composite skin 318B.

In some embodiments, the upper mold portion 320A or the lower mold portion 320B may be configured to form one or more pockets, curves, angles, or other transition regions in a composite sandwich. In an embodiment, a group of reinforcement fibers 314 disposed proximate to the upper mold portion 320A or the lower mold portion 320B may cause the reinforced composite structure formed therein to exhibit one or more pockets, curves, angles, or other transition regions. For example, when the group of reinforcement fibers 314 disposed on the first composite skin 318A are loaded into a mold and subjected to pressure and/or heat, one or more cells in the core blank adjacent thereto may at least partially deform (e.g., compress) to accommodate the group of reinforcement fibers 314 against the mold cavity.

Adjacent to the groups of reinforcement fibers 314, the core 304 may be compressed more than in other regions, such that the top surface of the reinforced composite structure is shaped by the upper mold portion 320A and the reinforcement fibers are compressed against and deform the top surface of the reinforced composite structure (e.g., the reinforcement fibers may be substantially flush or coplanar with adjacent regions of the top surface of the reinforced composite sandwich). In some embodiments, similar steps may be taken to add groups of reinforcement fibers to the second composite skin 318B adjacent to the lower mold 320B. The group of reinforcement fibers 314 and/or the first composite skin layer 318A may include a polymer resin therein or thereon, which during heating and/or compression may cause the group of reinforcement fibers 314 and first composite skin 318A to at least partially bond.

In one or more embodiments, the composite skin may be at least partially impregnated with the reinforcement fibers 314 to provide reinforcement. The reinforcement fibers 314 may be disposed in a recess formed on the composite sandwich from the outer surface inward. In an embodiment, the outer surface (e.g., the top and/or bottom surfaces) of the reinforced composite structure may be substantially smooth, with one or more pockets filled with one or more groups of reinforcement fibers. The outer surface of the reinforced composite structure so formed may complement the inner surfaces of the mold. As shown in FIG. 3B, in some embodiments, core blank may be deformed (e.g., compressed) from one or more sides to form the core 304. In one or more embodiments, the mold may be heated for a duration to cure the polymer resin in the composite skins therein, such that the shape of the mold is held in the resulting reinforced composite structure including the composite sandwich. In some embodiments, further groups of reinforcement fibers may be added for reinforcement subsequent to curing.

Figure 4A:
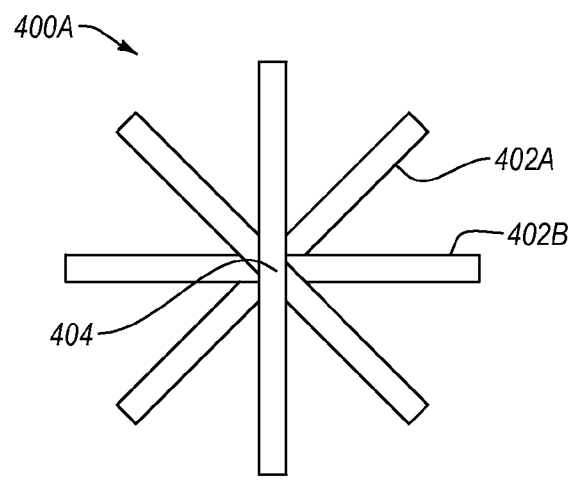
FIG. 4A is a top view of radially arranged groups of reinforcement fibers, according to an embodiment.

FIG. 4A is a top view of radially arranged (e.g., aligned to radially extend from a central point) reinforcement fibers. As noted above, reinforcement fibers may include many form groups or patches that may have any number of configurations, such as strips, blankets, sheets, etc. As shown, in FIG. 4A, a plurality of reinforcement fibers may be arranged in a radial pattern 400A. The reinforcement fibers 402 may be arranged to have an overlapping area 404 among all the groups of the fibers 402.

Moreover, the reinforcement fibers 402 may be arranged in patches or groups of reinforcement fibers 402A, 402B that may have different orientation from each other (e.g., about one or more coordinates or axes). The radial pattern 400A may be with reinforcement fibers 314 (as shown in FIG. 3A). There may be some benefits for the radial pattern 400A over the linear pattern of groups of reinforcement fibers 108 along a single direction (e.g., as shown in FIG. 1). For example, the radial pattern 400A may reinforce the composite to load in various directions.

Additionally, a reinforcement fibers 402 and/or patches formed therefrom and arranged in radial pattern 400A may be able to cover a larger surface area in a single step (e.g., provide resistance to stresses from multiple directions substantially at a single point) that several groups of reinforcement fibers applied apart but having similar directional arrangements cannot. In some embodiments, at least some of the patches 402A and 402B may include one or more of oriented fibers arranged in similar of different directions than the other, or may include randomly oriented discontinuous fibers.

Figure 4B:
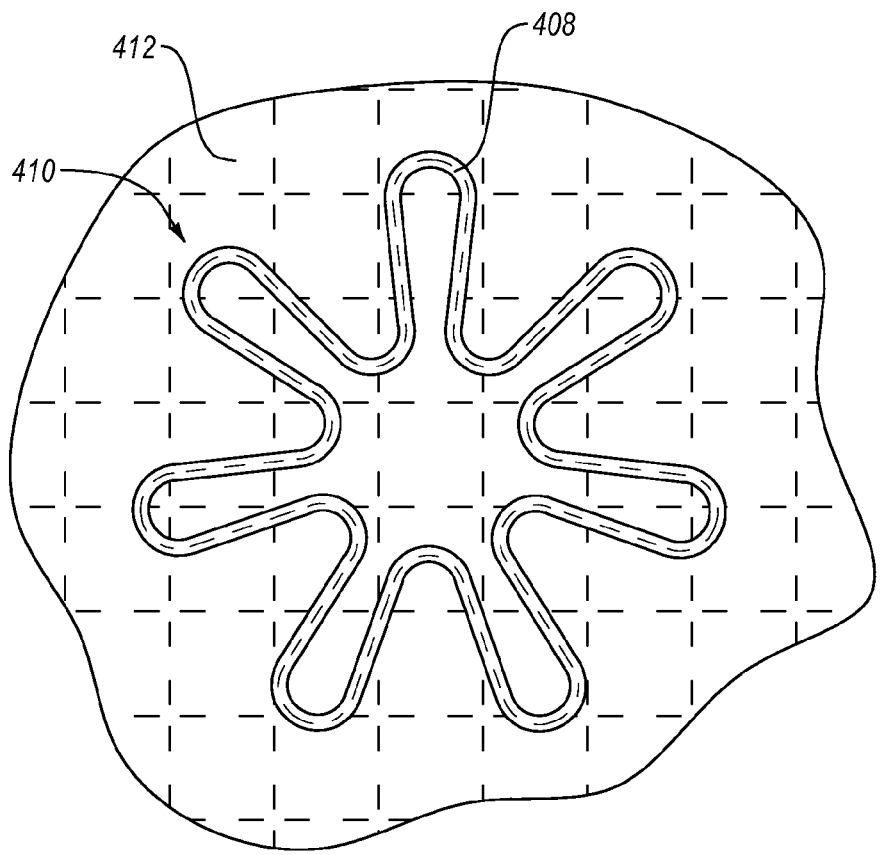
FIG. 4B is an isometric view of a composite structure including groups of reinforcement fibers, according to an embodiment.

FIG. 4B is an isometric view of group of reinforcement fibers 408 disposed over (e.g., bound to) a fiber sheet or layer of a composite skin 412. For example, the group of reinforcement fibers 408 may be arranged in a pattern 410 around a point of the composite skin expected to undergo stress, to reinforce the composite skin or composite structure including the same. Suitable patterns may include a sunburst pattern as shown, checker board patterns, linear patterns, random placement, tartan patterns, or combinations of any of the foregoing. The reinforcement fibers 408 may be affixed to the composite skin 412 by any suitable attachment means, such as adhesives, one or more fasteners, stitching, pressing and/or or heating, or combinations of any of the foregoing. Such patterns may help stiffen the transition region to withstand loads in various directions.

Figure 5:
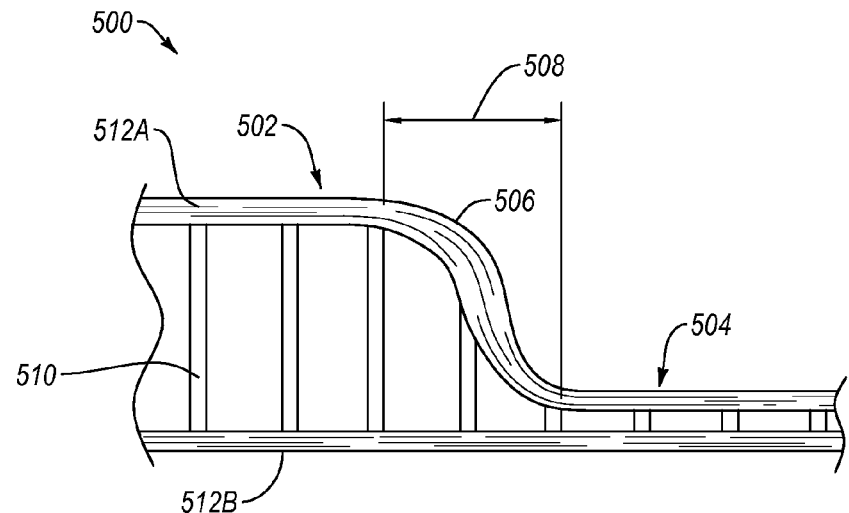
FIG. 5 is a cross-sectional view of a reinforced composite structure reinforced near the transition region with randomly oriented fibers according to an embodiment.

In some embodiments, a reinforced composite structure may include a composite sandwich reinforced by one or more regions of a composite skin therein having a thickness greater than adjacent regions of the composite skin. FIG. 5 is a cross-sectional view of a reinforced composite structure 500 reinforced at the transition region 508 with randomly oriented reinforcement fibers 506. A reinforced composite structure 500 may include a composite skin 512A having a sheet or layer of fibers including a thicker portion of fibers 506 therein for reinforcement in a transition region 508 between a first thicker section 502 and a second thinner section 504. The fiber sheet may include any fibers disclosed herein in any configuration disclosed herein. The reinforced composite structure 500 may include a core 510 between a first composite skin 512A on top of the core 510 and a second composite skin 512B under the core 510.

In an embodiment, the core 510 may have a taller height in one or more sections that in one or more other sections, such as in the first section 502, than in the second section 504. The transition region 508 may include a change in curvature (e.g., a changing slope and/or a compound curve as shown). As shown in FIG. 5, the thickness of the composite skin 512A may be larger in the transition region than in the first section 502 and the second section 504. The portion of the composite skin having a larger thickness may at least partially overlap the first section 502 and the second section 504 adjacent to the transition region 508. In some embodiments, the thickness of the thicker portion 506 may be about 120% of the thickness of the rest of the fiber sheet or composite skin 512A, such as about 120% to about 300%, about 130% to about 200%, about 140% to about 180%, or about 150% to about the thickness of the adjacent regions of the fiber sheet or composite skin 512A.

Figure 6A:
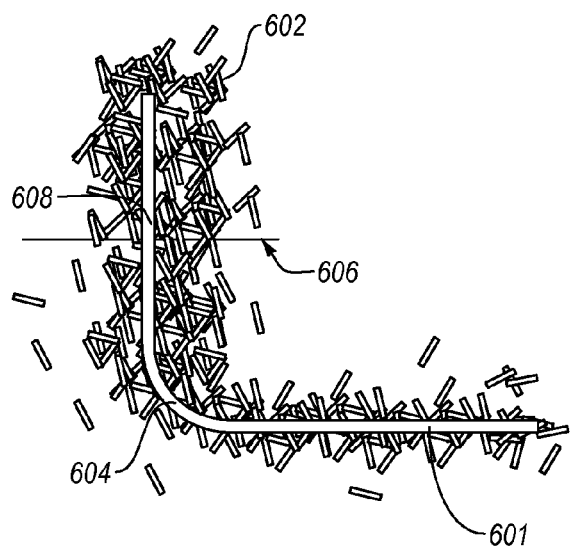
FIG. 6A is a top view of randomly oriented fibers extending around a corner of a composite structure according to an embodiment.

FIG. 6A is a top view of randomly oriented reinforcement fibers 602 included in a reinforced composite structure 601 (e.g., applied to a composite sandwich). The randomly oriented reinforcement fibers 602 may be disposed around a corner of the reinforced composite structure 601 in accordance with embodiments of the present disclosure, such as one or more sides (e.g., surfaces) thereof. The reinforced composite structure 601 may include one or more transition regions 604 which may be curved in any shape. As shown in FIG. 6A, randomly reinforcement fibers 602 may be disposed over (e.g., applied onto and bound to) a transition region 604 along the profile of the composite structure 601.

In an embodiment, the thickness and/or density of the reinforcement fibers 602 may vary across the cross section of the reinforced composite structure 601. For example, the reinforcement fibers 602 may be thicker or more densely packed in the middle 608 of the cross section of the composite structure and become thinner at ends 606 at distance away from the middle 608, such that the reinforcement fibers 602 exhibit a bell curve thickness or density centered about the middle 608. The change in thickness or density of the randomly oriented fibers 602 may reduce the stress concentration in, and strengthen, the transition region. The continuous change in thickness is also shown in the reinforced composite structure 500 (FIG. 5).

Figure 6B:
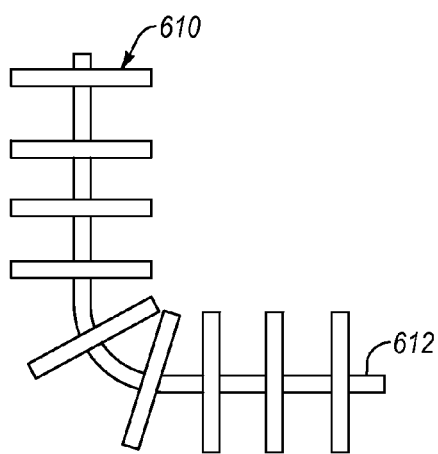
FIG. 6B is a top view of aligned fibers extending around a corner of composite structure according to an embodiment.

In some embodiments, one or more reinforcement fibers 610 may be disposed around one or more contours of the composite skin 612. FIG. 6B is a top view of reinforcement fibers 610 (e.g., aligned or oriented fibers) disposed around a corner of a reinforced composite structure 612 in accordance with embodiments of the present disclosure. As shown in FIG. 6B, reinforcement fibers 610 may be disposed over a transition region along the composite structure 612 and/or may form multiple patches (e.g., the patches formed by the reinforcement fibers 610 may have any number of suitable orientations as described above). In some embodiments, the reinforcement fibers 610 may be disposed substantially perpendicular to the curvature of the reinforced composite structure 612. In other embodiments, reinforcement fibers 610 may be parallel or oblique to the reinforced composite structure 612 at a discrete point therealong.

A polymer resin may be applied (e.g., sprayed or manually spread) over the additional reinforcement fibers. Then, the entire stack, which includes the composite stack having layers of fibers impregnated with resin, and the reinforcement fibers sprayed with the polymer resin, may be placed in a mold to be pressed and/or cured to form a reinforced composite structure of a desired shape.

Figure 7:
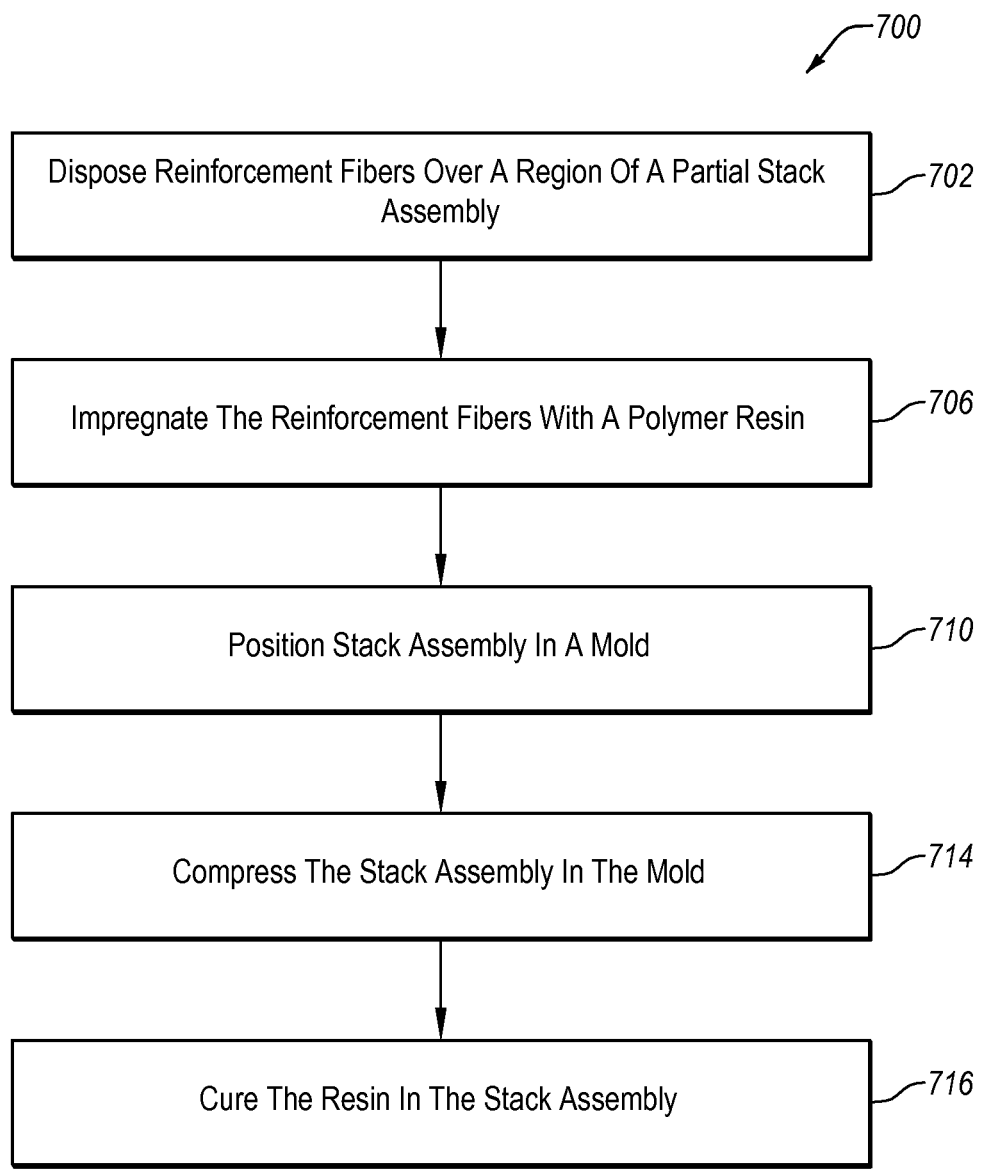
FIG. 7 is a flow chart illustrating steps for forming a reinforced composite structure having a reinforced transition region according to an embodiment.

FIG. 7 is a flow chart for a method 700 of forming a reinforced composite structure having a stiffened or reinforced transition region. The method 700 may include an act 702 of disposing reinforcement fibers over a region of a partial stack assembly (e.g., a region that may form a transition region). For example, the partial stack assembly may include opposing resin impregnated fiber sheets and a core blank positioned therebetween. The transition region may be formed to have any number of configurations as described above.

The method 700 may include the act 706 of impregnating the reinforcement fibers with a polymer resin, such as a liquid polymer resin. For example, a polymer resin may be spread and/or sprayed over at least some of the reinforcement fibers, such as over (e.g., onto) the reinforcement fibers and the fiber sheet of the composite skin adjacent thereto. Alternatively or additionally, the reinforcement fibers may be impregnated with the polymer resin of the resin impregnated fiber sheet (e.g., as the reinforcement fibers contact the resin impregnated fiber sheet). Any polymer resin disclosed herein or incorporated by reference may be used, such as a mixture of epoxy and polyurethane having about 5% to about 40% epoxy therein. In an embodiment, applying a polymer resin may include spraying the liquid polymer resin over the group of reinforcement fibers. In an embodiment, applying a polymer resin may include manually applying the liquid polymer resin over the group of reinforcement fibers, such as by pouring, dipping, or spreading with a spatula, trowel, brush, roller, etc.

In an embodiment, the method 700 may include an act 710 of positioning stack assembly in a mold. In particular, for example, the stack assembly may include resin impregnated fiber sheets, core blank, reinforcement fibers, metal insert, or combinations of the foregoing. Positioning the stack assembly in a mold may include positioning a first fiber sheet on a first mold half. Positioning the stack assembly in a mold may include positioning a core blank on the first fiber sheet. Positioning the stack assembly in a mold may include positioning a second fiber sheet on the core blank. Positioning the stack assembly in a mold may include positioning a metal insert proximate to one or more fiber sheets, such as between the fiber sheet and the mold or between the fiber sheet and the core. Positioning the stack assembly in a mold may include disposing or positioning a plurality of reinforcement fibers on one or more of the first fiber sheet or the second fiber sheet to reinforce the resulting composite sandwich. The reinforcement fibers may be positioned in any configuration disclosed herein or combinations thereof. In some embodiments, the polymer resin may be applied to the fiber sheets or groups of reinforcement fibers prior to positioning. In some embodiments, the polymer resin may be applied to the fiber sheets or groups of reinforcement fibers after positioning, but before positioning the metal insert. The first fiber sheet, the second fiber sheet, the group of reinforcement fibers, the metal inert, and the core blank may be similar or identical to any fiber sheet, group of reinforcement fibers, metal insert, or core blank described herein.

In an embodiment, the method 700 may include an act 714 of compressing the stack assembly in the mold. For example, compressing the stack assembly may include pressing the stack assembly while heating the stack assembly, such as heating the mold while pressing the mold. The method 700 may include the act of 7160 curing the resin in the stack assembly. Curing the polymer resin may include at least partially curing the polymer resin, such that the composite sandwich having groups of reinforcement fibers thereon agglomerates into a unitary whole reinforced composite structure. Curing the polymer resin may include heating the polymer resin. Heating the polymer resin may include heating he polymer resin to a temperature above about 70° C., such about 90° C. or more, about 100° C. or more, about 120° C. or more, about 130° C. or more, about 70° C. to about 200° C., about 90° C. to about 150° C., about 100° C. to about 180° C., about 120° C. to about 160° C., or about 130° C. Curing the polymer resin may include heating the compressed stack assembly in the mold. Heating the compressed stack assembly in the mold may be carried out while the stack assembly is under pressure in the mold. Heating may be carried out for any duration suitable to at least partially cure the polymer resin in the fibers, such as any time or time range disclosed herein. Curing the polymer resin may include heating the compressed stack assembly in an oven or kiln. Curing the polymer resin may include allowing compressed stack assembly to sit in ambient conditions for a predetermined duration. Curing may be carried out for 40 seconds or more, such as about 2 minutes or more, about 2 minutes to 1 day, about 5 minutes to about 10 hours, about 10 minutes to about 2 hours, about 15 minutes to an hour, about 1 minute to about 10 minutes, about 2 minutes to about 15 minutes, about 3 minutes to about 8 minutes, or about 5 minutes.

The foregoing method may form reinforced composite structures with one or more reinforced transition regions. The reinforced composite structures may include a composite sandwich having a first composite skin including a plurality of fibers embedded in a polymer matrix and a second composite skin including a plurality of fibers embedded in a polymer matrix, at least one transition region, and at least one group of reinforcement fibers positioned on the at least one transition region, the at least one group of reinforcement fibers attached to the composite sandwich to reinforce the transition region.

Having described several embodiments, it will be recognized by those skilled in the art that various modifications, alternative constructions, and equivalents may be used without departing from the spirit of the invention. Additionally, a number of well-known processes and elements have not been described in order to avoid unnecessarily obscuring the present invention. Accordingly, the above description should not be taken as limiting the scope of the invention.

What is claimed is:

1. A reinforced composite structure, comprising:
   a first composite skin including a plurality of fibers embedded in a polymer matrix;
   a second composite skin including a plurality of fibers embedded in a polymer matrix;
   a core positioned between at least portions of the first composite skin and the second composite skin and bonded thereto, the core including a plurality of cells defined by cell walls, each of the plurality of cells having a longitudinal axis substantially perpendicular to the at least portions of the first composite skin and second composite skin;
   a transition region at which one or more of the first composite skin or the second composite skin transition from a first geometric configuration to a second geometric configuration; and
   a plurality of reinforcement fibers defining one or more patches, each of the one or more patches positioned in the transition region and attached to one or more of the first composite skin or the second composite skin.

2. The reinforced composite structure of claim 1, wherein the plurality of reinforcement fibers include aligned fibers.

3. The reinforced composite claim 1, wherein at least some of the one or more patches are arranged to be substantially parallel to one another.

4. The reinforced composite structure of claim 1, wherein the transition region includes a bend line and at least some of the one or more patches are arranged to extend substantially perpendicular to the bend line of the transition region.

5. The reinforced composite structure of claim 1, the plurality of reinforcement fibers includes randomly oriented fibers.

6. The reinforced composite structure of claim 1, wherein the plurality of reinforcement fibers includes one or more of carbon fibers, glass fibers, or plastic fibers.

7. The reinforced composite structure of claim 1, wherein the core includes at least one of plastic tubes, cardboard, paperboard, low density foam, or high density foam.

8. The composite structure of claim 1, wherein the core includes a plurality of polycarbonate tubes bonded together.

9. The reinforced composite structure of claim 1, wherein one or more first portions of the first or second composite skins at the first geometric configuration are oriented at a non-parallel angle relative one or more second portions of the first or second composite skins at the second geometric configuration.

10. The reinforced composite structure of claim 1, wherein at the first geometric configuration the core has a first thickness and the second geometric configuration the core has a second thickness that is different than the first thickness.

11. The reinforced composite structure of claim 1, wherein at least a portion of each of the one or more patches extends substantially perpendicularly to the longitudinal axes of the plurality of cells in the core.

12. A reinforced composite structure having multiple geometric regions, the reinforced composite structure comprising:
a first composite skin including at least one first fiber sheet embedded in a polymer matrix;
a second composite skin including at least one second fiber sheet embedded in a polymer matrix;
a core positioned between at least portions of the first composite skin and the second composite skin and bonded thereto, the core including a plurality of cells defined by cell walls, each of the cells having a longitudinal axis substantially perpendicular to the at least a portion of the first and second skins;
wherein:
a first geometric region of the multiple geometric regions has a first geometric configuration defined by first portions of the first and second composite skins;
a second geometric region of the multiple geometric regions has a second geometric configuration defined by second portions of the first and second composite skins, the second geometric configuration being different from the first geometric configuration; and
a transition region of the multiple geometric regions connects together the first geometric region and the second geometric region;
a plurality of reinforcement fibers defining one or more patches, each of the one or more patches positioned in the transition region and attached to one or more of the first composite skin or the second composite skin.

13. The reinforced composite structure of claim 12, further comprising a metal insert attached to and at least partially surrounded by the first composite skin or the second composite skin.

14. The reinforced composite structure of claim 13, wherein the metal insert is at least partially surrounded by the core, the metal insert being separated from the core by the first composite skin or the second composite skin.

15. The reinforced composite structure of claim 12, wherein each of the fiber sheets in the first and second composite skins include carbon fiber sheets.

16. The reinforced composite structure of claim 12, wherein at least some of the one or more patches are arranged substantially parallel to one another.

17. The reinforced composite structure of claim 12, wherein the one or more patches includes a plurality of patches arranged in a radial pattern such that each patch is oriented at a different angle from another patch.

18. The reinforced composite structure of claim 12, wherein at least some of the one or more patches are pressed into the one or more of the first composite skin or the second composite skin.

19. The reinforced composite structure of claim 12, wherein the polymer matrices of the first and second composite skins include different cured polymer resins.

20. The reinforced composite structure of claim 12, wherein at least a portion of each of the one or more patches extends substantially perpendicularly to the longitudinal axes of the plurality of cells in the core.

* * * * *